United States Patent
Shi et al.

(10) Patent No.: US 11,878,434 B2
(45) Date of Patent: Jan. 23, 2024

(54) VISUAL-TACTILE PERCEPTION APPARATUS AND SMALL-SIZED ROBOT

(71) Applicant: BEIJING INSTITUTE OF TECHNOLOGY, Beijing (CN)

(72) Inventors: Qing Shi, Beijing (CN); Guanglu Jia, Beijing (CN); Tao Sun, Beijing (CN); Chen Chen, Beijing (CN); Yi Xu, Beijing (CN); Shurui Yan, Beijing (CN); Qiang Huang, Beijing (CN)

(73) Assignee: BEIJING INSTITUTE OF TECHNOLOGY, Beijing (CN)

( * ) Notice: Subject to any disclaimer, the term of this patent is extended or adjusted under 35 U.S.C. 154(b) by 440 days.

(21) Appl. No.: 17/153,140

(22) Filed: Jan. 20, 2021

(65) Prior Publication Data
US 2022/0143835 A1    May 12, 2022

(30) Foreign Application Priority Data
Nov. 6, 2020  (CN) .......................... 202011226701.9

(51) Int. Cl.
*B25J 9/16* (2006.01)
*G06T 7/593* (2017.01)
(Continued)

(52) U.S. Cl.
CPC ........... *B25J 9/1697* (2013.01); *B25J 13/006* (2013.01); *B25J 13/084* (2013.01); *B25J 19/023* (2013.01);
(Continued)

(58) Field of Classification Search
CPC ....... B25J 9/1697; B25J 19/023; B25J 13/006; B25J 13/084
See application file for complete search history.

(56) References Cited

U.S. PATENT DOCUMENTS 9,797,792 B2 * 10/2017 Moore .................... G01L 1/205
10,024,713 B1 * 7/2018 Martin .................. G01H 11/02
(Continued)

OTHER PUBLICATIONS

ADC STM32 Datasheet (Year: 2010).*
Amplifier AD8222 Datasheet (Year: 2016).*
Filter Stepdown AD8599 Datasheet (Year: 2015).*

*Primary Examiner* — Nicholas Kiswanto
(74) *Attorney, Agent, or Firm* — ROSSI, KIMMS & McDOWELL LLP

(57) ABSTRACT

The present disclosure provides a visual-tactile perception apparatus and a small-sized robot. The apparatus includes a visual perception module, a tactile perception module, a control module, and a signal transmission module. The signal transmission module is separately connected to the visual perception module, the tactile perception module, and the control module. The visual perception module is configured to obtain image information of a surrounding environment of the apparatus; the tactile perception module is configured to obtain tactile information of the surrounding environment of the apparatus; the signal transmission module is configured to transmit the image information and the tactile information to the control module; and the control module is configured to generate a control instruction based on the image information and the tactile information, and transmit the control instruction.

11 Claims, 6 Drawing Sheets

(51) Int. Cl.
*B25J 13/00* (2006.01)
*B25J 13/08* (2006.01)
*G06T 1/00* (2006.01)
*H04N 7/18* (2006.01)
*B25J 19/02* (2006.01)

(52) U.S. Cl.
CPC ............ *G06T 1/0014* (2013.01); *G06T 7/593* (2017.01); *H04N 7/181* (2013.01); *G06T 2207/10012* (2013.01)

(56) References Cited

U.S. PATENT DOCUMENTS

| | | | |
|---|---|---|---|
| 11,312,002 B2* | 4/2022 | Cappello | B25J 9/0087 |
| 2018/0150184 A1* | 5/2018 | Kim | G06F 3/044 |
| 2019/0212752 A1* | 7/2019 | Fong | G06V 10/82 |

* cited by examiner

VISUAL-TACTILE PERCEPTION APPARATUS AND SMALL-SIZED ROBOT

TECHNICAL FIELD

The present disclosure relates to the technical field of information acquisition, and in particular, to a visual-tactile perception apparatus and a small-sized robot.

BACKGROUND

As technology develops, devices are gradually miniaturized and made lightweight. For small-sized devices, a perception system is critical for intelligent control of the devices, automatic tracking and recognition of moving targets, and interaction with the environment. However, the small-sized device makes it more difficult to integrate a perception system therein.

The existing perception systems are mainly for visual perception, such as a monocular camera, a binocular camera, and a depth camera. However, the monocular camera cannot perform parallax calculations, so image depth information cannot be obtained; and the binocular camera and depth camera are large in size and cannot be applied to the field of small-sized machines. In addition, in the case of weak light, visual perception performs badly in perceiving information, or even cannot obtain image information. The visual perception system is blocked by objects when it is close to the objects in the environment, resulting in the loss of useful visual information. External factors such as shadows, light and jitter also affect the effect of visual perception and greatly affect the perception accuracy of the system.

There are also tactile perception systems in the prior art, which are generally pressed resistive. The pressed-resistive tactile perception method uses different vibration signals for tactile perception, and achieves a good perception effect for objects at a short distance without being affected by factors such as shadows, light and jitter. However, the tactile perception systems are also large in size and cannot be applied to small-sized devices. In addition, the perception systems using only tactile perception cannot quickly perceive the global environment due to its touch perception method, leading to low accuracy for perceiving the surrounding environment.

In summary, the robot perception systems are too large to be applied to small-sized devices; global or local environment perception effect is compromised when the distance to objects in the environment is too far or too close; and the perception accuracy is low. All these are the urgent problems facing those skilled in the art.

SUMMARY

The present disclosure aims to provide a visual-tactile perception apparatus and a small-sized robot incorporating the same. The visual-tactile perception apparatus is applied to small-sized devices such as small-sized robots. With a small size, the apparatus can still perform visual perception and tactile perception on the surrounding environment at the same time, thereby supporting both global and local environment perception. It also has the advantages of wide perception range and high perception accuracy.

To achieve the above objective, the present disclosure provides the following solutions:

A visual-tactile perception apparatus includes:

a visual perception module, a tactile perception module, a control module, and a signal transmission module, where the visual perception module is connected to the signal transmission module, and the visual perception module is configured to obtain image information of a surrounding environment of the apparatus;

the tactile perception module is connected to the signal transmission module, and the tactile perception module is configured to obtain tactile information of the surrounding environment of the apparatus;

the signal transmission module is connected to the control module, and the signal transmission module is configured to transmit the image information and the tactile information to the control module; and the control module is configured to generate a control instruction based on the image information and the tactile information, and transmit the control instruction.

Optionally, the visual perception module specifically includes:

a first camera and a second camera;

both the first camera and the second camera are connected to the signal transmission module;

the first camera is configured to obtain image information of the left front environment of the apparatus; and the second camera is configured to obtain image information of the right front environment of the apparatus.

Optionally, the tactile perception module specifically includes:

a first whisker sensor, a second whisker sensor, and a tactile information processing unit;

both the first whisker sensor and the second whisker sensor are connected to the tactile information processing unit; the first whisker sensor is configured to obtain tactile information of the left environment of the apparatus;

the second whisker sensor is configured to obtain tactile information of the right environment of the apparatus;

the tactile information processing unit is connected to the signal transmission module; and the tactile information processing unit is configured to perform analog-to-digital conversion on the tactile information of the left environment of the apparatus and the tactile information of the right environment of the apparatus, and transmit converted tactile information of the left environment of the apparatus and converted tactile information of the right environment of the apparatus to the signal transmission module.

Optionally, the signal transmission module specifically includes:

a first wireless image transmission module, a second wireless image transmission module, and a Wi-Fi module;

the first wireless image transmission module is connected to the first camera and the control module, and the first wireless image transmission module is configured to transmit the image information of the left front environment of the apparatus to the control module;

the second wireless image transmission module is connected to the second camera and the control module, and the second wireless image transmission module is configured to transmit the image information of the right front environment of the apparatus to the control module; and the Wi-Fi module is connected to the tactile information processing unit and the control module, and the Wi-Fi module is configured to transmit the converted tactile information of the left environment of the apparatus and the converted tactile information of the right environment of the apparatus to the control module.

Optionally, the tactile information processing unit specifically includes:

an analog-to-digital conversion circuit, a plurality of amplifying circuits, and a plurality of filter and step-down circuits;

each whisker of the first whisker sensor is connected to one amplifying circuit; each whisker of the second whisker sensor is connected to one amplifying circuit; a first output terminal of the amplifying circuit and a second output terminal of the amplifying circuit each are connected to one filter and step-down circuit; the amplifying circuit is configured to amplify tactile information acquired by a corresponding whisker;

output terminals of the plurality of filter and step-down circuits are connected to an input terminal of the analog-to-digital conversion circuit; the filter and step-down circuit is configured to perform filter processing on the amplified tactile information acquired by the corresponding whisker; the filter and step-down circuit is further configured to perform step-down processing on the filtered tactile information acquired by the corresponding whisker;

an output terminal of the analog-to-digital conversion circuit is connected to the Wi-Fi module; the analog-to-digital conversion circuit is configured to perform analog-to-digital conversion processing on a plurality of pieces of tactile information acquired by the corresponding whisker and obtained after the step-down processing; and the Wi-Fi module is configured to transmit a plurality of pieces of tactile information acquired by the corresponding whisker and obtained after the analog-to-digital conversion processing to the control module.

Optionally, the amplifying circuit includes an amplifying chip, and a model of the amplifying chip is AD8222; the filter and step-down circuit includes a filter and step-down chip, and a model of the filter and step-down chip is AD8599; and the analog-to-digital conversion circuit includes an analog-to-digital conversion chip, and a model of the analog-to-digital conversion chip is STM32.

Optionally, the apparatus further includes: a housing;
a first through hole and a second through hole are provided on the housing; and
the first camera is arranged at the first through hole, the second camera is arranged at the second through hole, the first whisker sensor is arranged on the left side of the housing, and the second whisker sensor is arranged on the right side of the housing.

A visual-tactile perception small-sized robot, where the small-sized robot uses the visual-tactile perception apparatus described above.

Compared with the prior art, the present disclosure has the following beneficial effects:

The present disclosure proposes a visual-tactile perception apparatus and a small-sized robot. A signal transmission module of the apparatus is separately connected to a visual perception module, a tactile perception module and a control module. The visual perception module is configured to obtain image information of a surrounding environment of the small-sized robot; the tactile perception module is configured to obtain tactile information of the surrounding environment of the small-sized robot; the signal transmission module is configured to transmit the image information and the tactile information to the control module; and the control module is configured to generate a control instruction based on the image information and the tactile information, and transmit the control instruction. The visual-tactile perception apparatus and the small-sized robot according to the present disclosure have a small size, and can obtain image information and tactile information of the surrounding environment at the same time, so that the present disclosure can accurately obtain the information of the surrounding environment at both long and short distances, and can implement both the global and local environment perception, with a high perception accuracy.

BRIEF DESCRIPTION OF DRAWINGS

To describe the technical solutions in the embodiments of the present disclosure or in the prior art more clearly, the following briefly introduces the accompanying drawings required for describing the embodiments or the prior art. Notably, the accompanying drawings in the following description show some embodiments of the present disclosure, and those of ordinary skill in the art may still derive other drawings from these accompanying drawing without any creative efforts.

FIG. 3A is a diagram of an amplifying circuit corresponding to a whisker of a visual-tactile sensor in the x direction according to an embodiment of the present disclosure; FIG. 3B is a diagram of an amplifying circuit corresponding to a whisker of a visual-tactile sensor in the y direction according to an embodiment of the present disclosure.

In the figures, the following elements are shown: 1. visual perception module; 2. tactile perception module; 3. signal transmission module; 4. first camera; 5. second camera; 6. first whisker sensor; 7. second whisker sensor; 8. first wireless image transmission module; 9. second wireless image transmission module; 10. Wi-Fi module; 11. tactile information processing unit; 12. control module; and 13. housing.

DETAILED DESCRIPTION

The following clearly and completely describes the technical solutions in the embodiments of the present disclosure with reference to accompanying drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

The present disclosure aims to provide a visual-tactile perception apparatus and a small-sized robot. The visual-tactile perception apparatus is applied to small-sized devices such as small-sized robots. With a small size, the apparatus can still perform visual perception and tactile perception on the surrounding environment at the same time, thereby supporting both global and local environment perception. It also has the advantages of wide perception range and high perception accuracy.

To make the foregoing objective, features, and advantages of the present disclosure clearer and more comprehensible, the present disclosure is further described in detail below with reference to the accompanying drawings and specific embodiments.

Embodiments

Figure 1:
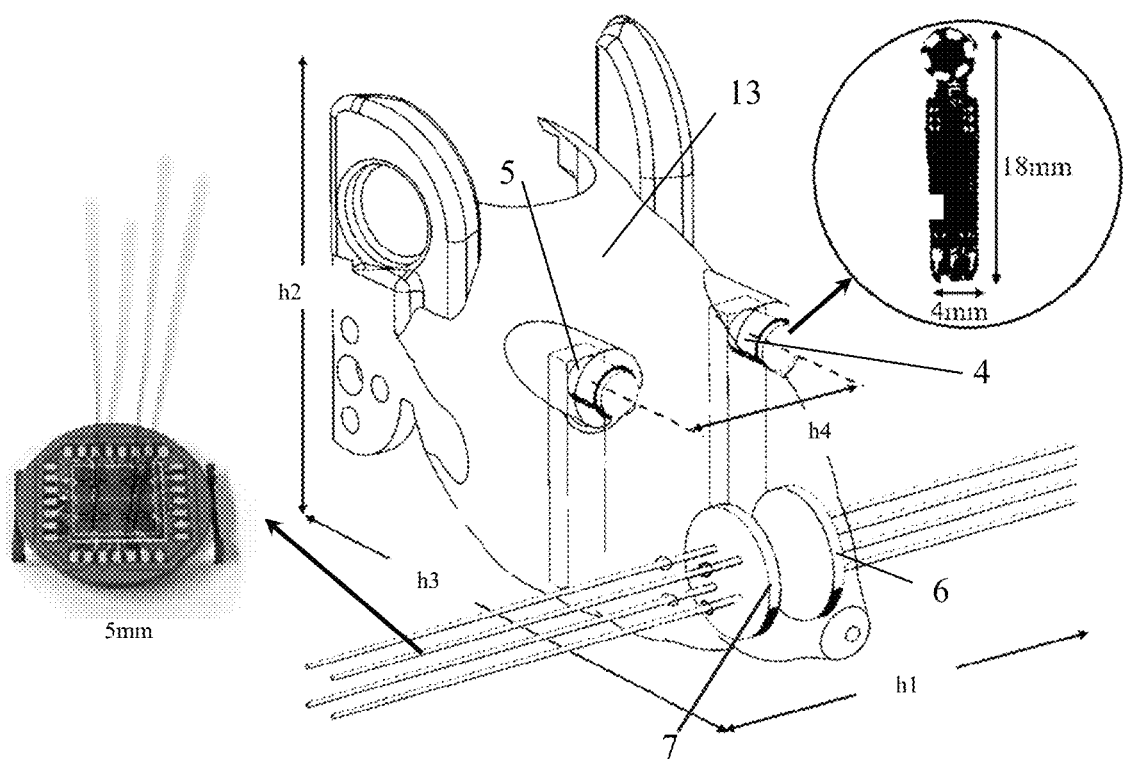
FIG. 1 is a schematic structural diagram of a visual-tactile perception apparatus according to an embodiment of the present disclosure.
Figure 2:
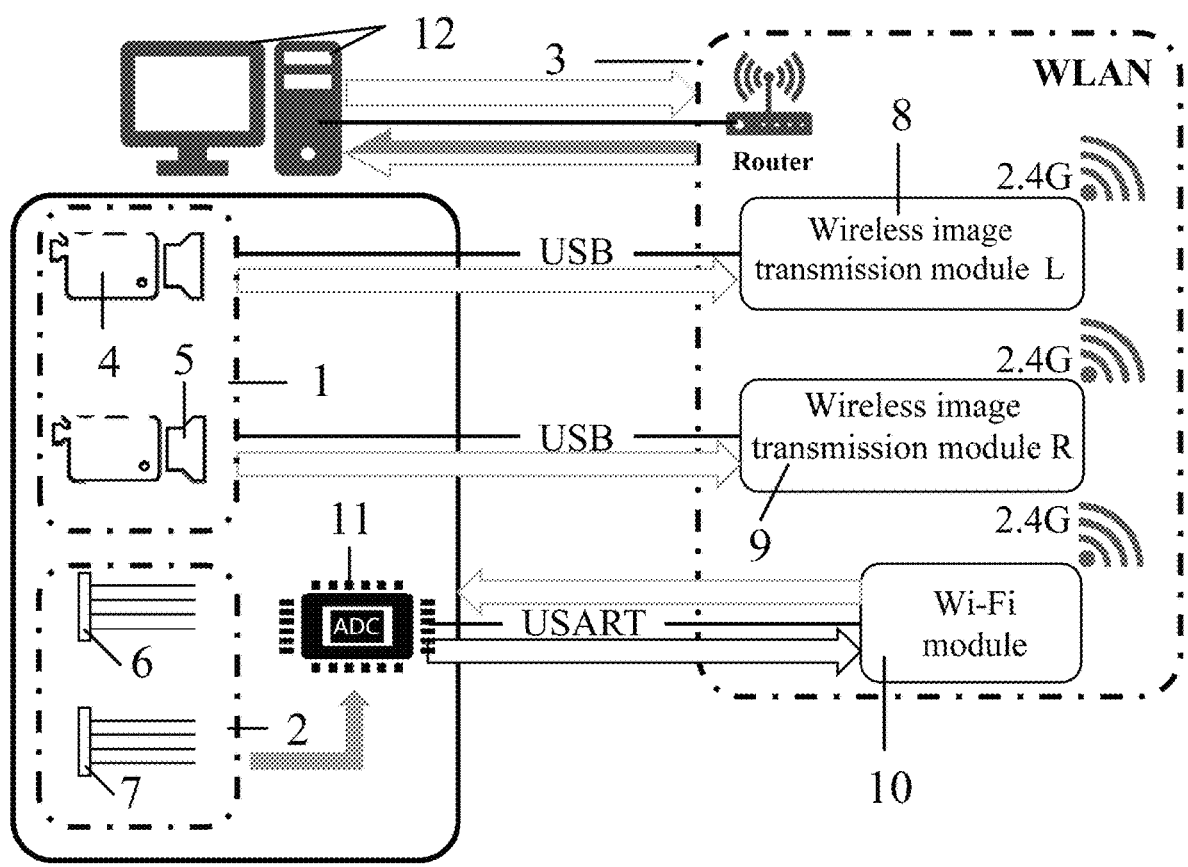
FIG. 2 is a simplified structural diagram of a visual-tactile perception apparatus according to an embodiment of the present disclosure.

FIG. 1 is a schematic structural diagram of a visual-tactile perception apparatus according to an embodiment of the present disclosure, and FIG. 2 is a simplified structural diagram of a visual-tactile perception apparatus according to an embodiment of the present disclosure. As shown in FIG. 1 and FIG. 2, the present disclosure provides a visual-tactile perception apparatus, including: a visual perception module 1, a tactile perception module 2, a control module 12, and a signal transmission module 3.

The visual perception module 1 is connected to the signal transmission module 3, and the visual perception module 1 is configured to obtain image information of a surrounding environment of the apparatus. The visual perception module 1 specifically includes: a first camera 4 and a second camera 5. Both the first camera 4 and the second camera 5 are connected to the signal transmission module 3. The first camera 4 is configured to obtain image information of the left front environment of the apparatus; and the second camera 5 is configured to obtain image information of the right front environment of the apparatus.

The tactile perception module 2 is connected to the signal transmission module 3, and the tactile perception module 2 is configured to obtain tactile information of the surrounding environment of the apparatus. The tactile perception module 2 specifically includes: a first whisker sensor 6, a second whisker sensor 7, and a tactile information processing unit 11. Both the first whisker sensor 6 and the second whisker sensor 7 are connected to the tactile information processing unit 11. The first whisker sensor 6 is configured to obtain tactile information of the left environment of the apparatus. The second whisker sensor 7 is configured to obtain tactile information of the right environment of the apparatus. The tactile information processing unit 11 is connected to the signal transmission module 3, and the tactile information processing unit 11 is configured to perform analog-to-digital conversion on the tactile information of the left environment of the apparatus and the tactile information of the right environment of the apparatus, and transmit converted tactile information of the left environment of the apparatus and converted tactile information of the right environment of the apparatus to the signal transmission module 3.

The tactile information processing unit 11 specifically includes an analog-to-digital conversion circuit, a plurality of amplifying circuits, and a plurality of filter and step-down circuits. Each whisker of the first whisker sensor 6 is connected to one amplifying circuit, and each whisker of the second whisker sensor 7 is connected to one amplifying circuit. A first output terminal and a second output terminal of the amplifying circuit each are connected to one filter and step-down circuit. The amplifying circuit is configured to amplify tactile information acquired by a corresponding whisker. Output terminals of the plurality of filter and step-down circuits are connected to an input terminal of the analog-to-digital conversion circuit. The filter and step-down circuit is configured to perform filter processing on the amplified tactile information acquired by the corresponding whisker. The filter and step-down circuit is further configured to perform step-down processing on the filtered tactile information acquired by the corresponding whisker. An output terminal of the analog-to-digital conversion circuit is connected to the signal transmission module 3. The analog-to-digital conversion circuit is configured to perform analog-to-digital conversion processing on a plurality of pieces of tactile information acquired by the corresponding whisker and obtained after the step-down processing. The signal transmission module 3 is configured to transmit a plurality of pieces of tactile information acquired by the corresponding whisker and obtained after the analog-to-digital conversion processing to the control module 12.

The amplifying circuit includes an amplifying chip AD8222; the filter and step-down circuit includes a filter and step-down chip AD8599; and the analog-to-digital conversion circuit includes an analog-to-digital conversion chip STM32.

The signal transmission module 3 is connected to the control module 12, and the signal transmission module 3 is configured to transmit the image information and the tactile information to the control module 12.

The signal transmission module 3 specifically includes: a first wireless image transmission module 8, a second wireless image transmission module 9, and a Wi-Fi module 10. The first wireless image transmission module 8 is connected to the first camera 4 and the control module 12, and the first wireless image transmission module 8 is configured to transmit the image information of the left front environment of the apparatus to the control module 12. The second wireless image transmission module 9 is connected to the second camera 5 and the control module 12, and the second wireless image transmission module 9 is configured to transmit the image information of the right front environment of the apparatus to the control module 12. The Wi-Fi module 10 is connected to the tactile information processing unit 11 (specifically, the output terminal of the analog-to-digital conversion circuit in the tactile information processing unit 11) and the control module 12, and the Wi-Fi module 10 is configured to transmit the converted tactile information of the left environment of the apparatus and the converted tactile information of the right environment of the apparatus to the control module 12. As shown in FIG. 2, the first camera 4 and the first wireless image transmission module 8, as well as the second camera 5 and the second wireless image transmission module 9, are connected through a universal serial bus (USB); the tactile perception module 2 and the Wi-Fi module 10 are connected through a universal synchronous/asynchronous receiver/transmitter (USART); the signal transmission module 3 and the control module 12 are connected through a wireless local area network (WLAN); and a router is configured to generate a WLAN.

The control module 12 is configured to generate a control instruction based on the image information and the tactile information, and transmit the control instruction. The control instruction is used to control the small-sized apparatus to which the present disclosure is applied.

The visual and tactile perception apparatus provided by the present disclosure further includes a housing 13. Size information of the housing 13 is shown in FIG. 1, where h1 to h4 are the dimensions of the housing, h1 is 30 mm, h2 is 40 mm, h3 is 50 mm, and h4 is 15 mm. A first through hole and a second through hole are provided on the housing 13. The first camera 4 is arranged at the first through hole; the second camera 5 is arranged at the second through hole; the first whisker sensor 6 is arranged on the left side of the housing 13; and the second whisker sensor 7 is arranged on the right side of the housing 13. The whiskers of the first whisker sensor 6 and the second whisker sensor 7 are all arranged outwards. The whiskers are used to touch objects to obtain tactile information. In the illustrated example, the housing 13 takes the shape of a mouse head and is part of a robot which, as will be readily appreciated by those skilled in the art, may further include a motorized mechanism that can be controlled based on the output of the visual-tactile perception apparatus.

Specifically, each whisker sensor includes four sensing units, and each sensing unit includes four fixed beams and a central connecting body. The four fixed beams are arranged in a cross-shaped structure, each fixed beam is attached with a varistor, and the central connecting body is provided with contact whiskers which are in contact with objects in the environment to generate tactile signals. The whisker sensor is manufactured based on the MEMS process (Microfabrication Process, silicon-on-insulator process and etching/multi-stress concentration method), which can greatly reduce the size. The working process is as follows: when the whiskers are bent due to external force, the whiskers can transmit the force to the cross beams to deform the beams, thereby causing the resistance of the varistor to change. The force received by the whiskers can be obtained by amplification, filtering, and conversion. The direction of the force can be calculated by the difference between two orthogonal beams.

Specifically, one whisker sensor has four whiskers. Each whisker has four outputs in two directions (x direction and y direction), and therefore one tactile sensor has 16 output voltages: IN11+, IN11−, IN12+, IN12−; IN21+, IN21−, IN22+, IN22−; IN31+, IN31−, IN32+, IN32−; IN41+, IN41−, IN42+, IN42−. IN11+ represents a first positive output of the first whisker in the x direction, IN11− represents a negative output of the first whisker in the x direction, IN12+ represents a positive output of the first whisker in they direction, IN12− represents a negative output of the first whisker in they direction; IN21+ represents a positive output of the second whisker in the x direction, IN21− represents a negative output of the second whisker in the x direction, IN22+ represents a positive output of the second whisker in they direction, IN22− represents a negative output of the second whisker in the y direction; IN31+ represents a third positive output of the third whisker in the x direction, IN31− represents a negative output of the third whisker in the x direction, IN32+ represents a positive output of the third whisker in they direction, IN32− represents a negative output of the third whisker in they direction; IN41+ represents a positive output of the fourth whisker in the x direction, IN41− represents a negative output of the fourth whisker in the x direction, IN42+ represents a positive output of the fourth whisker in the y direction, and IN42− represents a negative output of the fourth whisker in the y direction.

Figure 3A:
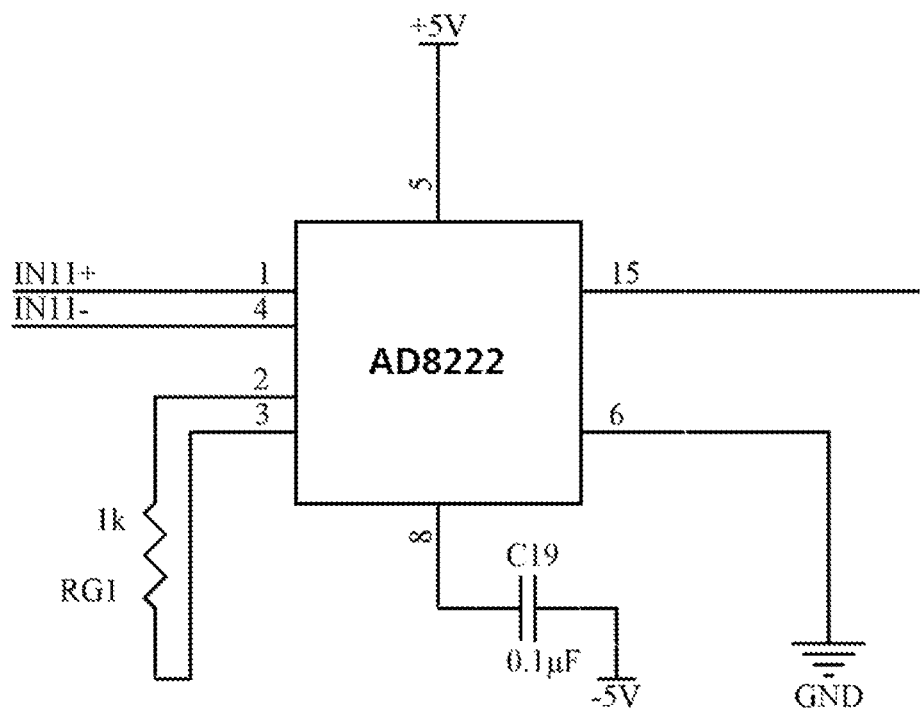
FIGS. 3A and 3B are diagrams of an amplifying circuit according to an embodiment of the present disclosure.
Figure 3B:
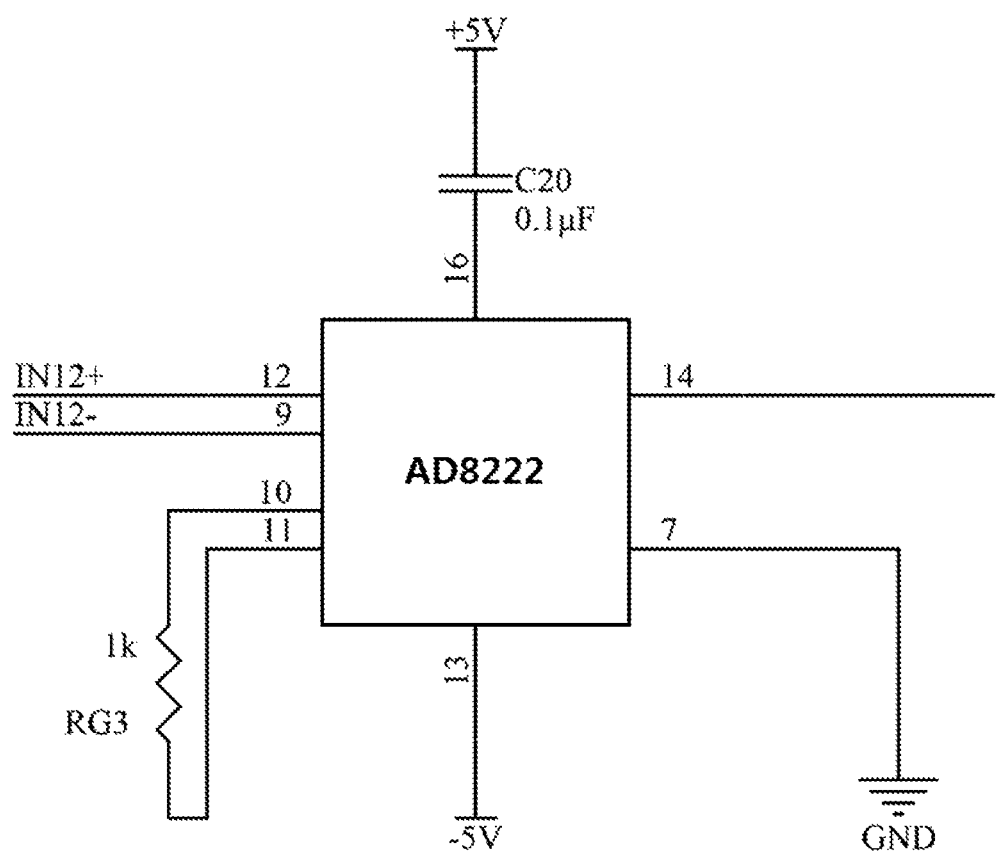
Figure 4:
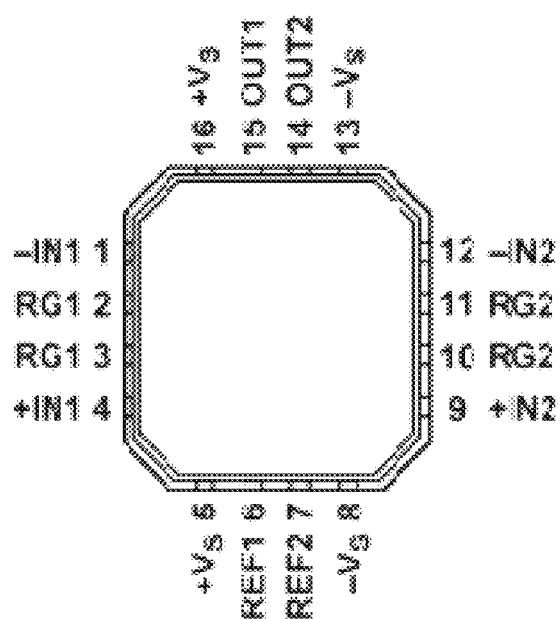
FIG. 4 is a pin diagram of an amplifying chip AD8222 according to an embodiment of the present disclosure.
Figure 5:
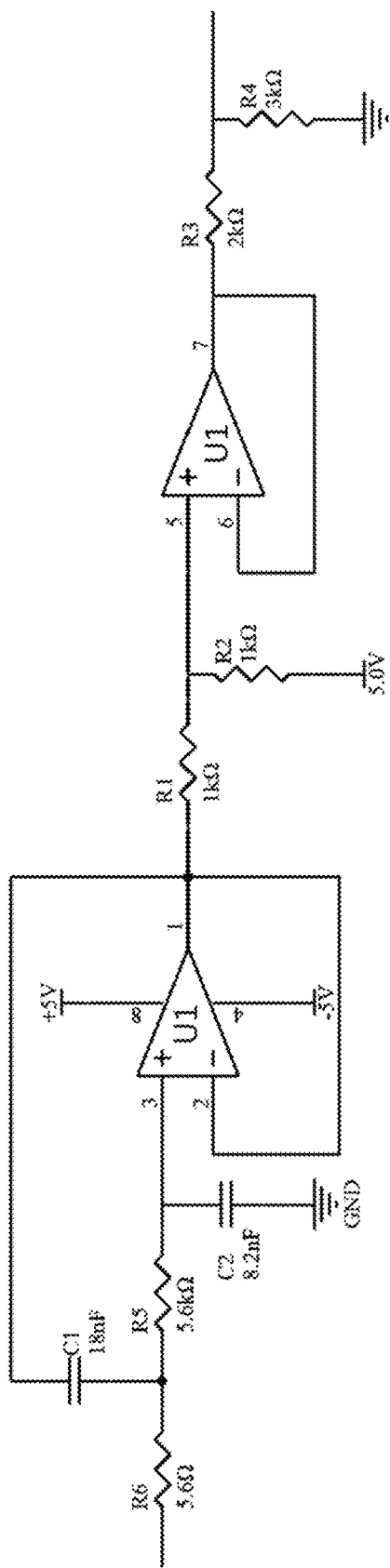
FIG. 5 is a filter and step-down circuit diagram according to an embodiment of the present disclosure.
Figure 6:
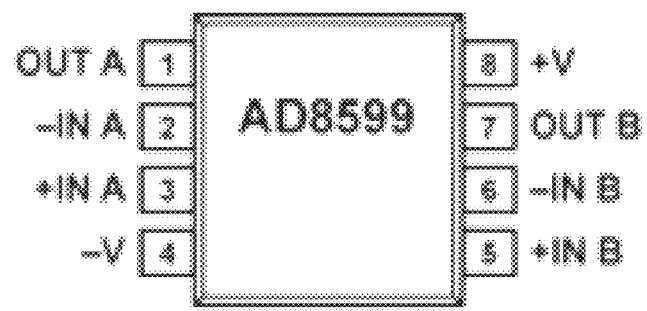
FIG. 6 is a pin diagram of a filter and step-down chip AD8599 according to an embodiment of the present disclosure.

One whisker of one whisker sensor is used as an example. FIGS. 3A and 3B are diagrams of an amplifying circuit according to an embodiment of the present disclosure; FIG. 3A is a diagram of an amplifying circuit corresponding to one whisker of a visual tactile sensor in the x direction according to an embodiment of the present disclosure; and FIG. 3B is a diagram of an amplifying circuit corresponding to one whisker of a visual tactile sensor in they direction according to an embodiment of the present disclosure, where RG1 and RG3 represent photoresistors, C19 represents a capacitor, and AD8222 chip pin names corresponding to the numbers outside the chip are shown in FIG. 4. FIG. 4 is a pin diagram of an amplifying chip AD8222 according to an embodiment of the present disclosure. FIG. 5 is a diagram of a filter and step-down circuit according to an embodiment of the present disclosure, where C1 and C2 represent capacitors, R1 to R6 represent resistors, U1 represents an AD8599 chip, the two chips in the figure are the same AD8599 chip, and specific AD8599 chip pin names corresponding to the numbers outside the chip are shown in FIG. 6. FIG. 6 is a pin diagram of a filter and step-down chip AD8599 according to an embodiment of the present disclosure.

As shown in FIGS. 3A-3B to FIG. 6, IN− pins (pin 1 and pin 12) and IN+ pins (pin 4 and pin 9) of the AD8222 chip are connected to a whisker of a whisker sensor; OUT pins of the AD8222 chip, namely pins 15 and 14, are connected to +IN pins (pin 3) of different AD8599 chips; and OUT B pins (pin 7) of all AD8599 chips are connected to the analog-to-digital conversion chip.

The present disclosure further provides a visual-tactile perception small-sized robot using the visual-tactile perception apparatus according to the present disclosure.

The visual-tactile perception apparatus obtains global environment information through visual perception, obtains local environment information through tactile perception (touching a surface of an object), generates, based on visual information and tactile information, control instructions that trigger moving and joint motions of the robot, and transmit the control instructions to a small-sized robot platform through a wireless network.

In the visual-tactile perception apparatus according to the present disclosure, miniature binocular cameras and whisker sensors are integrated in a small space (the housing), so that the surrounding environment can be perceived based on visual information and tactile information, with a large perception range and a high perception accuracy. In addition, in the present disclosure different transmission modules are configured for visual information and tactile information, preventing interference between signals and ensuring stable signal transmission with a low transmission delay.

Each embodiment of this specification is described in a progressive manner, each embodiment focuses on the difference from other embodiments. For the same or similar parts in the embodiments, mutual reference may be made.

In this specification, several examples are used for illustration of the principles and implementations of the present disclosure. The description of the foregoing embodiments is used to help illustrate the method of the present disclosure and the core principles thereof. In addition, those of ordinary skill in the art can make various modifications in terms of specific implementations and scope of application in accordance with the teachings of the present disclosure. In conclusion, the content of this specification shall not be construed as a limitation to the present disclosure.

What is claimed is:

1. A visual-tactile perception apparatus, wherein the apparatus comprises:
a visual perception module, a tactile perception module, a control module, and a signal transmission module, wherein
the visual perception module is connected to the signal transmission module, and the visual perception module is configured to obtain image information of a surrounding environment of the apparatus;
the tactile perception module is connected to the signal transmission module, and the tactile perception module is configured to obtain tactile information of the surrounding environment of the apparatus;

the signal transmission module is connected to the control module, and the signal transmission module is configured to transmit the image information and the tactile information to the control module; and the control module is configured to generate a control instruction based on the image information and the tactile information, and transmit the control instruction, wherein the visual perception module comprises a first camera and a second camera, both the first camera and the second camera are connected to the signal transmission module, the first camera is configured to obtain image information of a left front environment of the apparatus, and the second camera is configured to obtain image information of a right front environment of the apparatus, wherein the tactile perception module comprises a first whisker sensor, a second whisker sensor, and a tactile information processing unit, both the first whisker sensor and the second whisker sensor are connected to the tactile information processing unit, the first whisker sensor is configured to obtain tactile information of a left environment of the apparatus, the second whisker sensor is configured to obtain tactile information of a right environment of the apparatus, the tactile information processing unit is connected to the signal transmission module, and the tactile information processing unit is configured to perform analog-to-digital conversion on the tactile information of the left environment of the apparatus and the tactile information of the right environment of the apparatus, and transmit converted tactile information of the left environment of the apparatus and converted tactile information of the right environment of the apparatus to the signal transmission module, and wherein the signal transmission module comprises a first wireless image transmission module, a second wireless image transmission module, and a Wi-Fi module, the first wireless image transmission module is connected to the first camera and the control module, the first wireless image transmission module is configured to transmit the image information of the left front environment of the apparatus to the control module, the second wireless image transmission module is connected to the second camera and the control module, and the second wireless image transmission module is configured to transmit the image information of the right front environment of the apparatus to the control module, the Wi-Fi module is connected to the tactile information processing unit and the control module, and the Wi-Fi module is configured to transmit the converted tactile information of the left environment of the apparatus and the converted tactile information of the right environment of the apparatus to the control module.

2. The visual-tactile perception apparatus according to claim 1 wherein the tactile information processing unit specifically comprises:

an analog-to-digital conversion circuit, a plurality of amplifying circuits, and a plurality of filter and step-down circuits;

each whisker of the first whisker sensor is connected to one amplifying circuit; each whisker of the second whisker sensor is connected to one amplifying circuit; a first output terminal of the amplifying circuit and a second output terminal of the amplifying circuit each are connected to one filter and step-down circuit; the amplifying circuit is configured to amplify tactile information acquired by a corresponding whisker;

output terminals of the plurality of filter and step-down circuits are connected to an input terminal of the analog-to-digital conversion circuit; the filter and step-down circuit is configured to perform filter processing on the amplified tactile information acquired by the corresponding whisker; the filter and step-down circuit is further configured to perform step-down processing on the filtered tactile information acquired by the corresponding whisker;

an output terminal of the analog-to-digital conversion circuit is connected to the Wi-Fi module; the analog-to-digital conversion circuit is configured to perform analog-to-digital conversion processing on a plurality of pieces of tactile information acquired by the corresponding whisker and obtained after the step-down processing; and the Wi-Fi module is configured to transmit a plurality of pieces of tactile information acquired by the corresponding whisker and obtained after the analog-to-digital conversion processing to the control module.

3. The visual-tactile perception apparatus according to claim 2, wherein the amplifying circuit comprises an amplifying chip, and a model of the amplifying chip is AD8222;

the filter and step-down circuit comprises a filter and step-down chip, and a model of the filter and step-down chip is AD8599; and the analog-to-digital conversion circuit comprises an analog-to-digital conversion chip, and a model of the analog-to-digital conversion chip is STM 32.

4. A visual-tactile perception small-sized robot, wherein the small-sized robot uses the visual-tactile perception apparatus according to claim 3.

5. A visual-tactile perception small-sized robot, wherein the small-sized robot uses the visual-tactile perception apparatus according to claim 2.

6. The visual-tactile perception apparatus according to claim 1, wherein the apparatus further comprises: a housing;

a first through hole and a second through hole are provided on the housing; and the first camera is arranged at the first through hole, the second camera is arranged at the second through hole, the first whisker sensor is arranged on a left side of the housing, and the second whisker sensor is arranged on a right side of the housing.

7. A visual-tactile perception small-sized robot, wherein the small-sized robot uses the visual-tactile perception apparatus according to claim 6.

8. A visual-tactile perception small-sized robot, wherein the small-sized robot uses the visual-tactile perception apparatus according to claim 1.

9. A robot apparatus comprising:

a housing; and a visual-tactile perception device incorporated in said housing, wherein the visual-tactile perception device includes:

a visual perception module, a tactile perception module, a control module, and a signal transmission module, wherein the visual perception module is connected to the signal transmission module, and the visual perception module is configured to obtain image information of a surrounding environment of the apparatus;

the tactile perception module is connected to the signal transmission module, and the tactile perception module is configured to obtain tactile information of the surrounding environment of the apparatus;

the signal transmission module is connected to the control module, and the signal transmission module is configured to transmit the image information and the tactile information to the control module; and the control module is configured to generate a control instruction based on the image information and the tactile information, and transmit the control instruction, wherein the visual perception module comprises a first camera and a second camera, both the first camera and the second camera are connected to the signal transmission module, the first camera is configured to obtain image information of the left front environment of the apparatus, and the second camera is configured to obtain image information of the right front environment of the apparatus, wherein the tactile perception module comprises a first whisker sensor, a second whisker sensor, and a tactile information processing unit, both the first whisker sensor and the second whisker sensor are connected to the tactile information processing unit, the first whisker sensor is configured to obtain tactile information of the left environment of the apparatus, the second whisker sensor is configured to obtain tactile information of the right environment of the apparatus, the tactile information processing unit is connected to the signal transmission module, and the tactile information processing unit is configured to perform analog-to-digital conversion on the tactile information of the left environment of the apparatus and the tactile information of the right environment of the apparatus, and transmit converted tactile information of the left environment of the apparatus and converted tactile information of the right environment of the apparatus to the signal transmission module, and wherein the signal transmission module comprises a first wireless image transmission module, a second wireless image transmission module, and a Wi-Fi module, the first wireless image transmission module is connected to the first camera and the control module, the first wireless image transmission module is configured to transmit the image information of the left front environment of the apparatus to the control module, the second wireless image transmission module is connected to the second camera and the control module, and the second wireless image transmission module is configured to transmit the image information of the right front environment of the apparatus to the control module, the Wi-Fi module is connected to the tactile information processing unit and the control module, and the Wi-Fi module is configured to transmit the converted tactile information of the left environment of the apparatus and the converted tactile information of the right environment of the apparatus to the control module.

10. The robot apparatus according to claim 9, wherein the tactile information processing unit specifically comprises:

an analog-to-digital conversion circuit, a plurality of amplifying circuits, and a plurality of filter and step-down circuits;

each whisker of the first whisker sensor is connected to one amplifying circuit; each whisker of the second whisker sensor is connected to one amplifying circuit; a first output terminal of the amplifying circuit and a second output terminal of the amplifying circuit each are connected to one filter and step-down circuit; the amplifying circuit is configured to amplify tactile information acquired by a corresponding whisker;

output terminals of the plurality of filter and step-down circuits are connected to an input terminal of the analog-to-digital conversion circuit; the filter and step-down circuit is configured to perform filter processing on the amplified tactile information acquired by the corresponding whisker; the filter and step-down circuit is further configured to perform step-down processing on the filtered tactile information acquired by the corresponding whisker;

an output terminal of the analog-to-digital conversion circuit is connected to the Wi-Fi module; the analog-to-digital conversion circuit is configured to perform analog-to-digital conversion processing on a plurality of pieces of tactile information acquired by the corresponding whisker and obtained after the step-down processing; and the Wi-Fi module is configured to transmit a plurality of pieces of tactile information acquired by the corresponding whisker and obtained after the analog-to-digital conversion processing to the control module.

11. The robot apparatus according to claim 10, wherein the amplifying circuit comprises an amplifying chip, and a model of the amplifying chip is AD8222; the filter and step-down circuit comprises a filter and step-down chip, and a model of the filter and step-down chip is AD8599; and the analog-to-digital conversion circuit comprises an analog-to-digital conversion chip, and a model of the analog-to-digital conversion chip is STM32.

* * * * *